United States Patent

Broennum et al.

Patent Number: 5,824,714
Date of Patent: Oct. 20, 1998

[54] POLYETHER POLYOL FOR PREPARING RIGID POLYURETHANE FOAMS

[75] Inventors: Thomas Broennum, Louvain-La-Neuve, Belgium; Parminder Singh Sangha, Amsterdam, Netherlands; Johannes Cornelis Steinmetz, Louvain-La-Neuve, Belgium

[73] Assignee: Shell Oil Company, Houston, Tex.

[21] Appl. No.: 762,811

[22] Filed: Dec. 9, 1996

[30] Foreign Application Priority Data

Jul. 12, 1995 [EP] European Pat. Off. ............. 95203399

[51] Int. Cl.$^6$ .................................................. C08G 18/14
[52] U.S. Cl. ................... 521/155; 252/182.25; 521/159; 521/174; 521/177
[58] Field of Search ....................... 252/182.25; 521/159, 521/155, 174, 177

[56] References Cited

U.S. PATENT DOCUMENTS

| | | |
|---|---|---|
| 2,846,408 | 8/1958 | Brochhagen et al. . |
| 3,833,526 | 9/1974 | Cear et al. . |
| 4,581,388 | 4/1986 | Rasshofer et al. ...................... 521/159 |
| 5,124,369 | 6/1992 | Vandichel et al. ...................... 521/155 |
| 5,225,101 | 7/1993 | Yamamori ........................... 252/182.25 |

FOREIGN PATENT DOCUMENTS

| | | |
|---|---|---|
| 0 454 446 A1 | 10/1991 | European Pat. Off. . |
| 5 9047-223-A | 3/1984 | Japan . |

Primary Examiner—John M. Cooney, Jr.

[57] ABSTRACT

A polyether polyol is provided having an aromaticity in the range of from 5% to 35%, an average nominal functionality (Fn) in the range of from 2.0 to 4.5 and a hydroxyl value in the range of from 390 to 650 mg KOH/g, whereby the aromatic carbon atoms are contained in structural moieties of the general formula

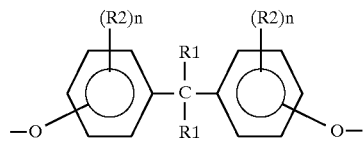

wherein both R1 groups independently represent hydrogen or a C1–C3 alkyl group; both R2 groups independently represent a C1–C3 alkyl group; and n is an integer of from 0 to 3. A further aspect of the disclosure is a process for the preparation of the above polyether polyol, which process comprises reacting an alkylene oxide with a polyhydric alcohol blend comprising a diphenylol alkane precursor of the above indicated structural moiety and at least one aliphatic or alicyclic polyhydric alcohol having a functionality of at least 2.0. A polyether polyol blend is also disclosed, the blend having an aromaticity in the range of from 2 to 10% and a Fn in the range of from 2.5 to 5.0 eq/mole, which blend comprises the above polyether polyol and one or more aliphatic or alicyclic polyether polyols having a Fn of at least 2.5.

13 Claims, No Drawings

POLYETHER POLYOL FOR PREPARING RIGID POLYURETHANE FOAMS

FIELD OF THE INVENTION

The present invention relates to a polyether polyol, to a process for its preparation, to a polyether polyol blend comprising this polyol and to a rigid polyurethane foam prepared by foaming a composition comprising said polyether polyol or polyol blend.

BACKGROUND TO THE INVENTION

Rigid polyurethane foams are well known in the art and have numerous applications, particularly as an insulating material. Examples include insulation of refrigerators and freezers, insulation of pipes and tanks in industrial plants and use as insulating material in the construction industry. Each specific application puts its own requirements on the rigid polyurethane foam to be used. The present invention mainly focuses on providing a rigid polyurethane foam which is especially suitable for use as an insulating material for pipes used in the district hot water transportation. Such pipe insulating foam must have sufficient flow properties to ensure homogeneity throughout the volume to be filled, whereby it, for instance, must be born in mind that the pipes to be insulated usually have lengths of more than three meters. Since the water to be transported via the district heating networks usually has temperatures of up to 130° C. with peaks up to 140° C. during the wintertime, the pipe composite must be able to withstand such temperatures for a long time without any deterioration of the composite occurring as a result of thermal stress forces. This requirement particularly applies for the insulating layers which are closest to the hot steel pipe. Here, minimum adhesion to the inner side of the outer pipe (e.g. corona-treated high density polyethylene) and outer side of the inner pipe (usually steel) as well as optimum mechanical strength and high temperature resistance of the insulating material is essential. The district heating networks in Eastern Europe even operate at higher temperatures than those in Western Europe, thus necessitating pipe composites which can withstand temperatures above 140° C. for long periods of time. This puts even more stringent demands on the rigid polyurethane foams used as the insulating material of the transportation pipes.

A major factor determining the final properties of a rigid polyurethane foam is the nature of the starting materials from which it is manufactured. The type and composition of the isocyanate component and the polyol component are very important in this respect. This has also been recognized in many prior art publications. The present invention mainly focuses on the type and nature of the polyol component. It has been found that by using a specific polyol, rigid polyurethanes can be manufactured which have excellent mechanical and thermal properties, thus making it a very suitable insulating material, particularly for the pipes used in district heating networks.

In U.S. Pat. No. 4,581,388 a process for preparing a urethane-modified polyisocyanate is disclosed which is obtained by reacting an organic polyisocyanate, suitably an aromatic polyisocyanate, with an organic polyhydroxyl compound comprising an alkoxylated bisphenol having a hydroxyl number of from 112 to 389, optionally in admixture with other aliphatic-polyhydroxyl compounds, such as various glycols and alkoxy adducts thereof and/or alkoxy adducts of trihydric alcohols like glycerol and trimethylol propane. The reaction between the polyisocyanate and the polyhydroxyl compound(s) is carried out such that the ratio of NCO to OH equivalents has a value of from 4 to 50, suitably from 4 to 20. The urethane-modified polyisocyanate product are designated as "semiprepolymers" and are disclosed to be very useful as polyisocyanate reactant in the production of rigid, semi-rigid and flexible polyurethane foams.

In Japanese patent application Laid-open No. 59-47223 rigid polyurethane foams are produced by reacting a polyisocyanate and a polyol in such amounts that the ratio of NCO to OH equivalents has a value of from 100 to 180. The polyol used comprises a mixture of alkoxylated bisphenol A and alkoxylated aromatic diamino compounds exemplified by 2,6-tolylenediamine. Additionally, the polyol may contain one or more alkoxylated aromatic polyhydric compounds such as hydroquinone. The foams produced are stated to have improved heat resistance and impact resistance.

However, in U.S. patent specification No. 5,225,101 the rigid polyurethane foams disclosed in the aforesaid Japanese patent application Laid-open No. 59-47223 are stated to be insufficient in mechanical strength, such as in toughness. The polyol composition disclosed in this U.S. patent would result in rigid polyurethane foams having both excellent heat resistance and mechanical properties, particularly an excellent toughness. The polyol composition disclosed comprises 20 to 50% by weight of an alkoxylated hydroquinone having a hydroxyl value of from 50 to 480. The remainder of the polyol composition up to 100% by weight is formed by a second polyol having a hydroxyl value of at least 400 and consisting of one or more alkoxylated polyhydric alcohols having a functionality of at least three and/or one or more alkoxylated polyamino compounds, optionally in admixture with a third polyol which is an alkoxylated mono- or dialkylene glycol. Among the suitable polyisocyanates are listed the well known tolylene diisocyanate- and the diphenylmethane diisocyanate-type of compounds, familiarly known as TDI and MDI, respectively.

Although the prior art rigid polyurethane foams perform satisfactory in many respects, there is still room for improvement. Particularly for application in pre-insulated pipes for district heating networks, where stringent demands in terms of high temperature resistance and mechanical properties are put on the polyurethane insulating layers, further optimization of the properties of the rigid polyurethane foams to be used is possible. The present invention aims to provide such rigid polyurethane foam having improved properties. More specifically, the present invention aims to provide rigid polyurethane foams having excellent high temperature resistance and excellent mechanical properties, thus making them very suitable as insulating material for steel pipes used in the hot water transportation system of district heating networks.

These and other objectives have been achieved by using a specific polyether polyol blend as part of the polyol component, which, upon foaming after reaction with a suitable polyisocyanate component, results in a rigid polyurethane foam having the desired properties.

SUMMARY OF THE INVENTION

Accordingly, the present invention relates to a polyether polyol having an aromaticity in the range of from 5% to 35%, an average nominal functionality (Fn) in the range of from 2.0 to 4.5 and a hydroxyl value in the range of from 390 to 650 mg KOH/g, whereby the aromatic carbon atoms are contained in structural moieties of the general formula

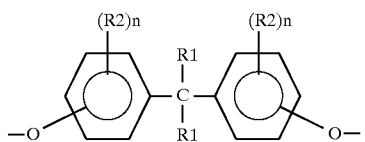

wherein both R1 groups independently represent hydrogen or a C1–C3 alkyl group; both R2 groups independently represent a C1–C3 alkyl group; and n is an integer of from 0 to 3.

The expression "aromaticity" refers to the weight percentage of aromatic carbon atoms, i.e. carbon atoms contained in an aromatic ring structure, present in a compound or formulation relative to the total weight of the compound or formulation. If the aromaticity of a formulation comprising polyisocyanate, water and polyol is to be determined, the total weight of the formulation is corrected for the weight of carbon dioxide formed in the isocyanate/water reaction. Thus, in this case the weight of the carbon dioxide formed in the isocyanate/water reaction is subtracted from the sum of the weight of all individual components to arrive at the total weight of the formulation. The aromatic carbons in the polyol according to the present invention are all contained in the structural moieties defined above.

The aromaticity of the polyether polyol is in the range of from 5% to 35% and preferably has a value in the range of from 10 to 35%, while very good results have also been attained with polyether polyols having an aromaticity of from 20 to 33%. The average nominal functionality Fn of the polyether polyol should be in the range of from 2.0 to 4.5, whereby those polyether polyols having a functionality of from 2.2 to 4.0 are preferred. The hydroxyl value of the polyether polyol should be in the range of from 390 to 650 mg KOH/g, and very good results have been achieved with hydroxyl values in the range of from 400 to 550 mg KOH/g.

The aromatic carbons present in the polyether polyol according to the present invention are present in structural moieties having the formula indicated above. These structural moieties originate from aromatic polyhydric alcohols of the diphenylol alkane-type. In principle any structural moiety falling within the definitions given for R1, R2 and n may be used. However, preferred moieties are those having at most one methyl group attached to the aromatic ring (i.e. n equals zero or one with R2 representing a methyl group) and both R1 groups independently being hydrogen, methyl or ethyl. The most preferred structural moieties are those of the above formula wherein n is equal to zero and both R1 groups are methyl or both R1 groups are hydrogen as exemplified by moieties originating from diphenylolpropane and diphenylolmethane, respectively. 4,4'-Diphenylolpropane is also known as Bisphenol A, whilst 4,4'-diphenylolmethane is known as Bisphenol F. Of these, the Bisphenol A-like structure is most preferred.

In general, a polyether polyol can be obtained by the alkoxylation, i.e. reaction with alkylene oxide, of a suitable polyhydric alcohol component. It has been found that the present polyether polyol can be obtained by using a blend of specific polyhydric alcohols as the polyhydric alcohol component, which blend is reacted with an alkylene oxide. It will be understood that by reacting a blend of polyhydric alcohols with alkylene oxide, the molecular structure of the resulting polyether polyol product will be entirely different from a polyether polyol product obtained by first reacting each individual polyhydric alcohol with alkylene oxide followed by blending the resulting polyether polyols. This latter process is, for instance, disclosed in the aforementioned U.S. Pat. Nos. 4,581,388 and 5,225,101 as the manner for obtaining the products disclosed therein.

The present invention also relates to a process for the preparation of a polyether polyol as described above, which process comprises reacting an alkylene oxide with a polyhydric alcohol blend comprising:

(a) a compound according to the general formula

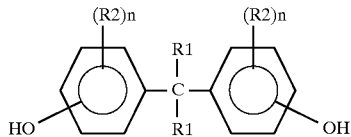

wherein both R1 groups independently represent hydrogen or a C1–C3 alkyl group; both R2 groups independently represent a C1–C3 alkyl group; and n is an integer of from 0 to 3; and (b) at least one aliphatic or alicyclic polyhydric alcohol having a functionality of at least 2.0.

In general, preparing polyether polyols by alkoxylating of a polyhydric alcohol, i.e. reacting an alkylene oxide with a polyhydric alcohol, is well known in the art. In the present process, a blend of polyhydric alcohols is reacted with alkylene oxide. The polyhydric alcohols used in the present process are suitably added sequentially to the reactor prior to alkoxylation. Process conditions are those conventionally applied, i.e. temperatures between 80° and 150° C. and pressures up to 10 bar. The catalyst used may be any catalyst known in the art for preparing polyether polyols. Both acid and basic catalysts can, accordingly, be used. Examples of acid catalysts include Lewis acids like boron trifluoride, stannic chloride or combinations of ferric chloride with thionyl chloride. For the purpose of the present invention basic catalysts are preferred. The basic catalyst most commonly used is potassium hydroxide. The catalyst is suitably added to the reactor after all polyhydric alcohols have been added and before the alkylene oxide is added. The amount of catalyst used is within the range normally applied, i.e. from 0.05 to 2% by weight on final product. Alkylene oxides usually applied, and also useful for the present invention, are ethylene oxide, propylene oxide and butylene oxide. For the purpose of the present invention it is, however, preferred to use ethylene oxide, propylene oxide or a mixture thereof. After completion of the alkoxylation reaction, the catalyst is suitably removed by neutralization with a suitable neutralizing agent, such as phosphoric acid or disodiumdihydrogenpyrophosphate.

The aromatic polyhydric alcohol having the formula indicated above may in principle be any diphenylol alkane falling within the definitions given for R1, R2 and n. However, preferred compounds are those having at most one methyl group attached to the aromatic ring (i.e. n equals zero or one with R2 representing a methyl group) and both R1 groups independently being hydrogen, methyl or ethyl. The most preferred compounds are those compounds of the above formula wherein n is equal to zero and both R1 groups are methyl or both R1 groups are hydrogen as exemplified by Bisphenol A and Bisphenol F, respectively. Of these, Bisphenol A is most preferred.

The aliphatic or alicyclic polyhydric alcohol used as component (b) may be any such alcohol or mixture of alcohols having a Fn of 2.0 or more, suitably of from 2 to 8. Examples, then, include diols like diethylene glycol, monoethylene glycol, monopropylene glycol and dipropylene glycol, and polyols like glycerol, trimethylol propane, sucrose, sorbitol, pentaerythritol and diglycerine. In a particularly preferred embodiment component (b) comprises an aliphatic polyhydric alcohol having a Fn of from 2 to 4, such as a glycol or glycerol, and an aliphatic polyhydric alcohol having a Fn of from 5 to 8, such as sorbitol and sucrose.

The polyether polyol according to the present invention must meet the requirements with respect to aromaticity and aromatic carbon atoms, Fn and hydroxyl value as defined hereinbefore. These requirements together with the alkylene oxide used and exact structures of both aromatic and aliphatic polyhydric alcohol polyol (i.e. components (a) and (b)) determine the exact quantities, in which components (a) and (b) are used.

In order to produce rigid polyurethane foams which are very useful as insulating material in district heating pipes, it has been found that a polyol according to the present invention or a polyol blend comprising such polyol, whereby this polyol or polyol blend should have an aromaticity in the range of from 2 to 10% and a Fn in the range of from 2.5 to 5.0 equivalents per mole (eq/mole) gives excellent results. Accordingly, those polyols according to the present invention which have an aromaticity of from 5 to 10% and a Fn of from 2.5 to 4.5 eq/mole may be used as such for preparing the desired rigid polyurethane foams. The polyether polyol may also be blended with at least one aliphatic and/or alicyclic polyether polyol in such amount that the resulting polyol blend has an aromaticity in the range of from 2 to 10% and a Fn in the range of from 2.5 to 5.0 eq/mole. Particularly if the polyether polyol as described hereinbefore has an aromaticity of more than 10%, so between 10 and 35%, such blending is useful to obtain a polyol meeting the said requirements of aromaticity and Fn.

Accordingly, the present invention also relates to a polyether polyol blend comprising (1) a polyether polyol as described hereinbefore having an aromaticity of from 10 to 35%; and (2) an aliphatic or alicyclic polyether polyol or blend of two or more aliphatic or alicyclic polyether polyols, which polyol or blend of polyols has a Fn of at least 2.5, whereby the amounts of components (1) and (2) are such that the polyether polyol blend has an aromaticity in the range of from 2 to 10% and a Fn in the range of from 2.5 to 5.0 eq/mole.

In practice, it has been found that the amounts of components (1) and (2) suitably are 10 to 50 parts by weight (pbw), preferably 15 to 30 pbw, of component (1) and up to a total of 100 pbw of component (2).

Component (2) may be any aliphatic or alicyclic polyether polyol or blend of two or more of these polyols having a Fn of 2.5 or more, provided it results in a polyol blend meeting the indicated requirements with respect to Fn and aromaticity when blended with the aforesaid polyether polyol. Examples include alkoxy adducts of pentaerythritol, sucrose and sorbitol. Polyether polyols or polyol blends useful as component (2) are also available as commercial products. Examples are CARADOL GB 250-01, CARADOL GB 475-01, CARADOL GB 570-01 and CARADOL PP 520-03 (CARADOL is a trade mark).

In a preferred embodiment, the above polyether polyol blend has a hydroxyl value in the range of from 390 to 650 mg KOH/g, more preferably 400 to 550 mg KOH/g.

As has already been discussed above, the present invention aims at providing an insulating material which is particularly useful for insulating pipes used in district heating networks. It has been found that by foaming a composition comprising either a polyether polyol as defined above having a certain aromaticity and Fn or the polyether polyol blend defined above as the polyol reactant and an aromatic polyisocyanate reactant, whereby the polyol reactant should account for a specified percentage of the total aromaticity of the polyurethane product, a rigid polyurethane foam is obtained having excellent mechanical properties and heat resistance, thus making it very suitable as a pipe insulating material.

Accordingly, the present invention further relates to a rigid polyurethane foam having a total aromaticity in the range of from 35% to 50%, preferably from 40 to 45%, obtainable by foaming a composition comprising (i) a polyol reactant consisting essentially of a polyether polyol described hereinbefore provided it has an aromaticity of from 5 to 10% and a Fn of from 2.5 to 4.5 or of a polyether polyol blend as described hereinbefore which meets these requirements and (ii) an aromatic polyisocyanate in such amount that the isocyanate index is from 100 to 150, preferably from 105 to 140, whereby the polyol reactant accounts for between 1 and 10% of the total aromaticity of the rigid polyurethane foam.

It is important that between 1 and 10%, preferably between 2 and 8%, of the total aromaticity of the rigid polyurethane foam eventually obtained originates from the polyol reactant. It has been found that if this condition is met, the resulting polyurethane foam has an excellent mechanical strength and high temperature resistance thus making it very suitable as a pipe insulating material.

As is generally known, the isocyanate index is defined as the equivalence ratio of isocyanate groups to active hydrogen atoms, such as those present in the polyol reactant and water. In accordance with the present invention, this isocyanate index should be in the range of from 100 to 150, preferably from 105 to 140.

The aromatic polyisocyanate may be any aromatic di-, tri-, tetra- and higher isocyanate known in the art to be suitably applied in the production of rigid polyurethane foams. Mixtures of two or more of such aromatic polyisocyanates may also be applied. Examples of suitably aromatic polyisocyanates then include 2,4-toluene diisocyanate, 2,6-toluene diisocyanate, mixtures of 2,4- and 2,6-toluene diisocyanates, 1,5-naphthene diisocyanate, 2,4-methoxyphenyl diisocyanate, 4,4'-diphenyl-methane diisocyanate (MDI), 4,4'-biphenylene diisocyanate, 3,3'-dimethoxy-4,4'-biphenylene diisocyanate, 3,3'-dimethyl-4,4'-biphenylene diisocyanate and 3,31dimethyl-4,4'-diphenylmethane diisocyanate, 4,4',4"triphenylmethane triisocyanate, 2,4,6-toluene trilsocyanate, 4,4'-dimethyl-2,2', 5,5'-diphenylmethane tetraisocyanate, polymethylenepolyphenylene polyisocyanate and mixtures of two or more of these. The preferred polyisocyanate, however, is polymeric MDI, a mixture of polyisocyanates with MDI as the main component. Examples of commercially available polymeric MDI grades are CARADATE 30, DESMODUR 44V20 and SUPRASEC VM90HF (CARADATE, DESMODUR and SUPRASEC are trade marks).

In the production of the rigid polyurethane-foam at least one blowing agent and a catalyst are used in addition to the polyether polyol reactant and the polyisocyanate reactant. In principle any conventional method for producing rigid polyurethane foams may be applied. For pipe insulation the in situ formation of the rigid foam is most conveniently applied. Suitable catalysts are described in European patent specification No. 0,358,282 and include tertiary amines, salts of carboxylic acids and organometallic catalysts. Examples of suitable tertiary amines are triethylene diamine, N-methylmorpholine, N-ethylmorpholine, diethylethanolamine, N-cocomorpholine, 1-methyl-4- dimethylaminoethyl-piperazine, 3-methoxypropyldimethylamine, N,N,N'trimethylisopropyl propylenediamine, 3-diethylamino propyldiethylamine, dimethylbenzylamine and dimethylcyclohexylamine. An example of a carboxylic acid salt useful as a catalyst is sodium acetate. Suitable organometallic catalysts include stannous octoate, stannous oleate, stannous acetate, stannous laureate, lead octoate, lead naphthenate, nickel naphthenate, cobalt naphthenate and dibutyltin dichloride. Further examples of organometallic compounds useful as catalyst in the production of polyurethanes are described in U.S. Pat. No. 2,846,408. Mixtures of two or more of the above catalysts may also be applied. For the purpose of the present invention it has been found particularly advantageous to use dimethylcyclohexylamine.

The amounts in which the catalyst is used usually varies within the range of from 0.01 to 5.0 pbw, more suitably within the range of from 0.2 to 2.0 pbw, per 100 pbw of polyether polyol reactant.

Suitable blowing agents to be used for preparing the rigid polyurethane foam according to the present invention include water, halogenated hydrocarbons, aliphatic alkanes and alicyclic alkanes. Due to the ozone depleting effect of the fully chlorinated, fluorinated alkanes (CFC's) the use of this type of blowing agents is not preferred, although it is possible to use them within the scope of the present invention. The halogenated alkanes, wherein at least one hydrogen atom has not been substituted by a halogen atom (the so called HCFC's) have a lower ozone depleting potential and therefore are the preferred halogenated hydrocarbons to be used in physically blown foams. A very suitable HCFC type blowing agent is 1-chloro-1,1-difluoroethane. The use of water as a (chemical) blowing agent is also well known. Water reacts with isocyanate groups according to the well known $HCO/H_2O$ reaction, thereby releasing carbon dioxide which causes the blowing to occur. The aliphatic and alicyclic alkanes, finally, were developed as alternative blowing agents for the CFC's. Examples of such alkanes are n-pentane and n-hexane (aliphatic) and cyclopentane and cyclohexane (alicyclic). It will be understood that the above blowing agents may be used singly or in mixtures of two or more. Of the blowing agents mentioned, water and cyclopentane have been found to be particularly suitable as blowing agent for the purpose of the present invention. The amounts wherein the blowing agents are to be used are those conventionally applied, i.e. between 0.1 to 5 pbw per 100 pbw of polyol reactant in case of water and between about 0.1 and 20 pbw per 100 pbw of polyol reactant in case of halogenated hydrocarbons, aliphatic alkanes and alicyclic alkanes.

In addition to the catalyst and blowing agent, other auxiliaries known in the art, such as flame retardants, foam stabilizers (surfactants) and fillers may also be used. For instance, the well known organosilicone surfactants are most conventionally applied as foam stabilizers. A large variety of organo silicone surfactants is commercially available.

The rigid polyurethane foam according to the present invention suitably has an overall density in the range of from 30 to 250 kg/m$^3$, but preferably from 60 to 110 kg/m$^3$. As is well known in the art, the rigid polyurethane foam may be subjected to a curing treatment by heating the foam to a temperature, usually between 100° C. and 160° C., for a certain period of time. Curing times are usually within the range of from 30 minutes to 48 hours may be applied, although any time outside this range may be applied as well.

The present invention also relates to the use of a rigid polyurethane foam as described hereinbefore as a high temperature resistant pipe insulation foam as well as to a preinsulated pipe comprising such polyurethane foam. Shaped articles comprising the rigid polyurethane foam defined hereinbefore are also part of the present invention.

The invention is further illustrated by the following examples without restricting the scope of the invention to these specific embodiments.

EXAMPLE 1

A polyhydric alcohol blend of bisphenol A, glycerol and sorbitol (molar ratio bisphenol A: glycerol:sorbitol is 1.0:2.4:1.1) was reacted with propylene oxide (19.1 moles) as follows.

Glycerol was added to the reactor and the reactor was heated up to 100° C. Then, bisphenol A was added and the temperature was raised to 110° C. Hereafter, the sorbitol (70% syrup as supplied by Roquette Freres) was added under continuous stirring, directly followed by 0.2% by weight on final product of potassium hydroxide (KOH) as the catalyst. The water present in the sorbitol and KOH was removed by heating the reactor to 120° C. and applying a vacuum of about 5–10 mmHg (6.7–13.3 mbar) until the water content was reduced to less than 0.5% by weight on reaction mixture. Propylene oxide was then added at 110° C., whereby the pressure in the reactor was kept below 5 bar. The alkoxylation reaction was allowed to proceed until the pressure had reached a constant value of 1.5 bar. The KOH catalyst was removed by neutralizing the reaction mixture with disodiumdihydrogenpyrophosphate (PURON, trademark). The resulting polyol product had an aromaticity of 8.6%, a hydroxyl value of 498 mg KOH/g and a Fn of 3.5 eq/mole.

This polyol was subsequently used in a foam formulation comprising (per 100 pbw of the polyol)
3.25 pbw water
1.0 pbw Silicone B 8404 (trademark; a silicone polymer)
1.2 pbw dimethyl cyclohexylamine (DIME-6)
10.0 pbw HCFC 142B (1-chloro-1,1-difluoroethane blowing agent)
185.0 pbw CARADATE 30 (trademark; polymeric MDI)

The rigid polyurethane foam obtained by foaming of the above formulation was applied as an insulating material in a pipe segment of a pipe normally used in district heating networks, i.e. with an inner pipe of steal and a high density polyethylene outer pipe. Properties are listed in Table I.

As can be seen form Table I, the rigid polyurethane foam applied as an insulating layer in a district heating pipe segment exhibits an excellent high temperature resistance (softening temperature without post curing treatment already 155° C.) in combination with very good mechanical properties.

TABLE I

| Rigid polyurethane foam | |
|---|---|
| Isocyanate index | 110 |
| Overall density (kg/m$^3$) | 88.2 |
| Compression strength at 150° C. (kPa) | 371 |
| Softening temperature (°C.): | |
| initial | 155 |
| after post cure (150° C.; 24 hrs) | 163 |
| Axial shear strength (kPa) | 529 |
| Total Aromaticity (%) | 42.2 |
| Aromaticity from polyol: | |
| absolute (%) | 3.1 |

TABLE I-continued

| Rigid polyurethane foam | |
|---|---|
| relative in % of total | 7.3 |

EXAMPLE 2

The rigid polyurethane foam obtained in example 1 was subjected to an ageing test, which involved maintaining the foam at temperatures of 165° C. and 175° C. for an increasing period of time. At various points in time, softening temperature (Soft. temp.), compressive strength (Compr. strength) and weight loss were determined.

Softening temperature was determined by thermomechanical analysis using a penetration probe exerting a stress of 100 kPa on a cylindrical foam sample using a heating rate of 10° C./min.

Compressive strength was determined according to the draft European standard (final draft prEN 253, drawn up by Technical Committee CEN/TC 107).

Weight loss of the foam was determined by thermogravimetric analysis: the foam is grounded into a powder, which is placed in a microbalance and heated from 30° C. to 450° C. at a heating rate of 10° C./min under atmospheric conditions. The weight loss at 450° C. was measured.

The results are listed in Table II.

TABLE II

Ageing performance at 165° C. and 175° C.

| Ageing time (weeks) | Softening temperature (°C.) | | Compressive strength (23° C.; kPa) | | Weight loss (%) | |
|---|---|---|---|---|---|---|
| | 165° C. | 175° C. | 165° C. | 175° C. | 165° C. | 175° C. |
| 0 | 164 | 164 | 879 | 879 | 50.7 | 50.7 |
| 2 | 203 | 211 | 1020 | 1057 | 51.7 | 51.1 |
| 4 | 212 | 210 | 1045 | 1020 | 49.5 | 47.3 |
| 8 | 208 | 202 | 1035 | 1013 | 47.6 | 45.9 |
| 12 | 209 | 194 | 1016 | 690 | 46.9 | 44.8 |
| 20 | 206 | 173 | 922 | 773 | 46.0 | 41.2 |
| 28 | 195 | — | 975 | — | 45.8 | — |
| 35 | 197 | — | 1018 | — | 45.0 | — |
| 44 | 191 | — | 1007 | — | 43.6 | — |
| 83 | 150 | — | 880 | — | 41.7 | — |

From Table II it can be seen that the ageing behavior of the rigid foam is very good, thus making it very useful as an insulating material for hot water distribution pipes.

EXAMPLE 3

A polyhydric alcohol blend of bisphenol A and glycerol (molar ratio bisphenol A: glycerol is 1:1) was reacted with propylene oxide (4.1 mole per mole bisphenol A) in a similar way as described in Example 1. The resulting aromatic polyol had an aromaticity of 27.1%, a hydroxyl value of 492 mg KOH/g and a Fn of 2.5 eq/mole.

Two polyol blends were prepared from this aromatic polyol by blending it with two or three aliphatic polyether polyols selected from CARADOL GB 250-01, CARADOL GB 475-01 and CARADOL GB 570-01. The two polyol blends prepared (blend A and blend B) had a composition as indicated in Table III.

TABLE III

Polyol blends

| | Polyol blend A | Polyol blend B |
|---|---|---|
| CARADOL GB 250-01 (pbw) | 8.0 | — |
| CARADOL GB 475-01 (pbw) | 33.0 | 43.7 |
| CARADOL GB 570-01 (pbw) | 46.3 | 22.0 |
| Aromatic polyol (pbw) | 12.7 | 34.3 |

Both polyol blends were subsequently used in two different foam formulations (formulation PU-A and PU-B), the compositions of which are indicated in Table IV. The properties of the rigid, fully water-blown, polyurethane foams obtained from these two formulations are also indicated in Table IV.

From Table IV it can be seen that both rigid polyurethane foams obtained from formulations PU-A and PU-B, respectively, exhibited excellent high temperature resistance and mechanical properties.

TABLE IV

Foam formulations and polyurethane foams

| | PU-A | PU-B |
|---|---|---|
| Polyol blend A (pbw) | 100 | — |
| Polyol blend B (pbw) | — | 100 |
| Water (pbw) | 3.99 | 3.99 |
| Silicone B 8404 (pbw) | 1.0 | 1.0 |
| DIME 6 (pbw) | 0.78 | 0.75 |
| CARADATE 30 (pbw) | 195.7 | 195.7 |
| Isocyanate index | 110 | 110 |
| Overall density (kg/m³) | 90.0 | 90.0 |
| Total Aromaticity (%) | 41.5 | 43.5 |
| Aromaticity from polyol | | |
| absolute (%) | 1.2 | 3.2 |
| relative in % of total | 2.9 | 7.4 |
| Softening temperature (°C.) | | |
| initial | 167.8 | 180.3 |
| after post cure (130° C.; 24 hrs) | 175.5 | 185.7 |
| Compressive strength (kPa) | | |
| at 23° C. | 798 | 840 |
| at 130° C. | 451 | 501 |

We claim:

1. A rigid polyurethane foam having a total aromaticity in the range of from 35% to 50%, produced by a process comprising the steps of:

(i) providing a polyol reactant consisting of one or more polyether polyol, the polyether polyols having a weight average aromaticity in the range of from 5% to 35%, a weight average nominal functionality (Fn) in the range of from 2.5 to 4.5 and an average hydroxyl value in the range of from 390 to 650 mg KOH/g, whereby the aromatic carbon atoms are contained in structural moieties of the general formula

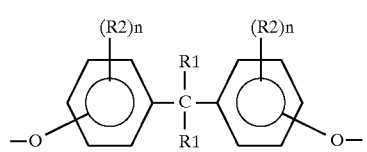

wherein both R1 groups independently represent hydrogen or a C1–C3 allyl group;

both R2 groups independently represent a C1–C3 alkyl group; and n is an integer of from 0 to 3;

(ii) reacting the polyol with an aromatic polyisocyanate, whereby the polyol reactant accounts for between 1 and 10% of the total aromaticity of the rigid polyurethane foam; and (iii) recovering a rigid polyurethane foam having a total aromaticity in the range of from 35% to 50%.

2. A process to produce a rigid polyurethane foam having a total aromaticity in the range of from 35% to 50%, the process comprising the steps of:

(i). reacting an alkylene oxide with a polyhydric alcohol blend to form a polyether polyol, the polyhydric alcohol blend comprising:

(a) a compound according to the general formula

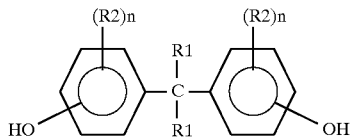

wherein both R1 groups independently represent hydrogen or a C1–C3 alkyl group; both R2 groups independently represent a C1–C3 alkyl group; and n is an integer of from 0 to 3, and (b) an aliphatic or alicyclic polyhydric alcohol having a functionality of at least 2 wherein the resultant polyether polyol has a weight average aromaticity in the range of from 5% to 35%, a weight average nominal functionality (Fn) in the range of from 2.5 to 4.5 and an average hydroxyl value in the range of from 390 to 650 mg KOH/g;

(ii) reacting the polyether polyol with an aromatic polyisocyanate, whereby the polyol reactant accounts for between 1 and 10% of the total aromaticity of the rigid polyurethane foam; and (iii) recovering a rigid polyurethane foam having a total aromaticity in the range of from 35% to 50%.

3. The rigid polyurethane foam of claim 1, wherein n is equal to zero and both R1 groups are methyl or both R1 groups are hydrogen.

4. The rigid polyurethane foam of claim 1, which has an aromaticity in the range of from 10 to 35%.

5. The process of claim 2, wherein the alkylene oxide is ethylene oxide, propylene oxide or a mixture thereof.

6. The process of claim 2 wherein component (b) comprises an aliphatic polyhydric alcohol having a Fn of from 2 to 4 and an aliphatic polyhydric alcohol having a Fn of from 5 to 8.

7. The process of claim 2 wherein the aliphatic or alicyclic polyhydric alcohol having a functionality of at least 3.

8. The process of claim 2 wherein the aliphatic or alicyclic polyhydric alcohol comprises sorbitol.

9. The process of claim 2 wherein the aliphatic or alicyclic polyhydric alcohol comprises glycerol.

10. The process of claim 2 wherein the recovered rigid polyurethane foam has a softening temperature of at least 167.8° C.

11. The process of claim 10 wherein the recovered rigid polyurethane foam has a compressive strength at 130° C. of at least 451 kPa.

12. The rigid polyurethane foam of claim 1 wherein the rigid polyurethane foam has a softening temperature of at least 167.8° C.

13. The rigid polyurethane foam of claim 1 wherein the rigid polyurethane foam has a compressive strength at 130° C. of at least 451 kPa.

* * * * *